Nov. 18, 1930.                M. BASTIAENS                1,781,968
              MEASURING DISPENSING DEVICE FOR CONTAINERS
                       Original Filed July 26, 1927
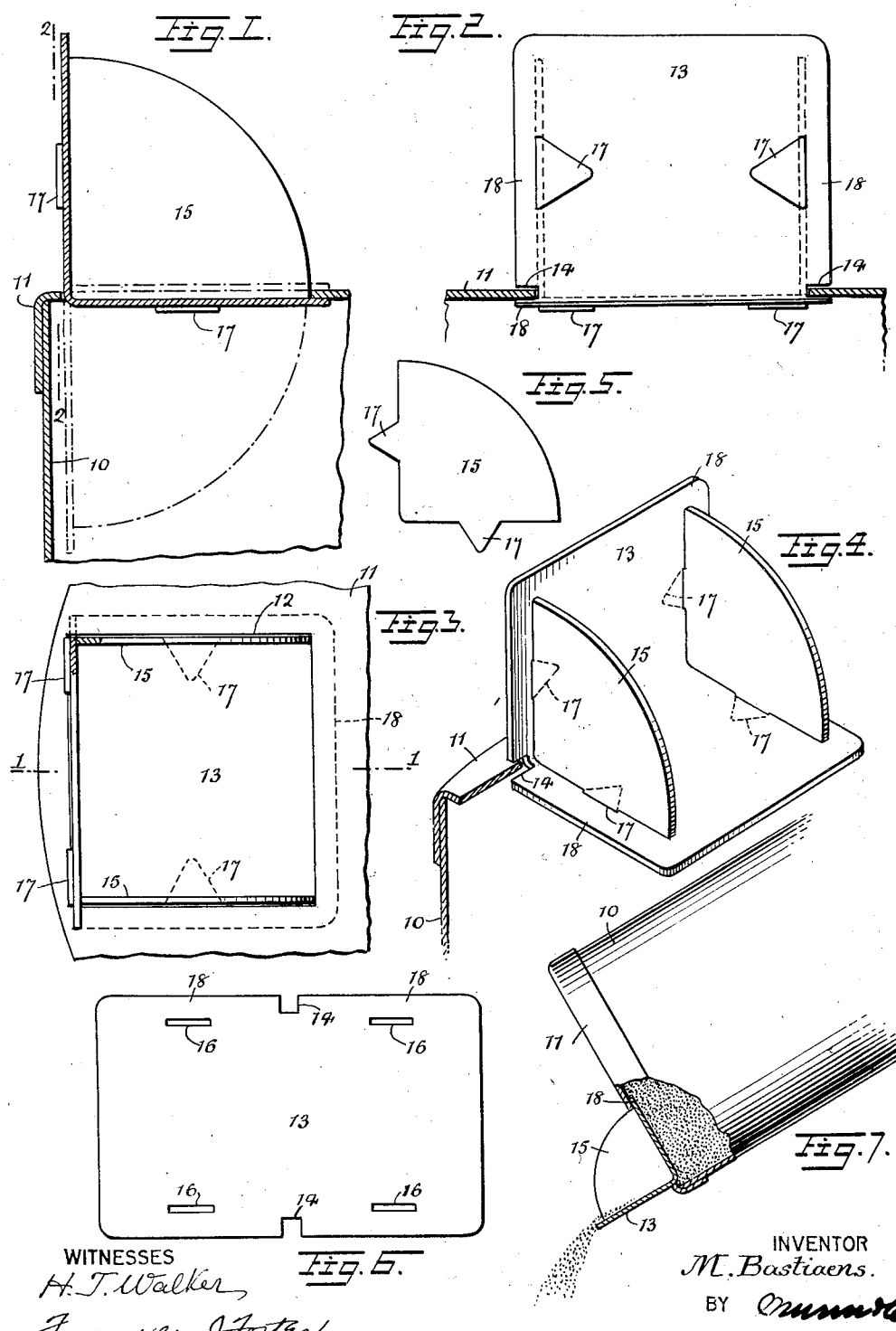
WITNESSES                                            INVENTOR
                                                   M. Bastiaens.
                                              BY
                                                     ATTORNEY Patented Nov. 18, 1930

1,781,968

UNITED STATES PATENT OFFICE

MARION BASTIAENS, OF ELBERON, NEW JERSEY, ASSIGNOR TO BELLE-REA CORPORATION, OF WILMINGTON, DELAWARE, A CORPORATION OF DELAWARE

MEASURING DISPENSING DEVICE FOR CONTAINERS

Application filed July 26, 1927, Serial No. 208,617. Renewed April 5, 1930.

The measuring dispensing attachment of the present invention is capable of a wide range of utility in the arts in connection with various classes of containers and for dispensing numerous classes of materials, finding one of its embodiments for instance as an attachment for coffee can tops.

An object of the invention is to provide an attachment of this character for container tops, which will permit the measured dispensing of powdered, granular, or other forms of material from the container, prevent the discharge of too much material at one time, and effectively seal the dispensing opening against spilling of material or the entrance of air and moisture. This sealing effect is present regardless of whether the dispensing device is in opened or closed position.

Other objects of the invention are to provide a dispensing device in which the necessity for springs, hinges or soldering is entirely eliminated, and by virtue of which the can top may be sealed permanently to the can if desired.

Other objects of the invention are to provide a device of simple, practical construction, which will be rugged, durable and efficient in use, well suited to the requirements of economical manufacture and to the proper preservation of the coffee in the can.

Further objects are to provide a measuring, dispensing container which may be conveniently manually manipulated, and with which substantially accurately measured quantities of coffee may be dispensed, and substantially the full contents of the coffee can discharged in measured quantities through the dispensing opening.

With the above noted and other objects in view, the invention consists in certain novel features of construction and combinations and arrangements of parts, as will be more fully hereinafter set forth and pointed out in the claim. The invention may be more fully understood from the following description in connection with the accompanying drawings, wherein—

Fig. 1 is a fragmentary longitudinal sectional view through a container equipped with the attachment of the present invention, this view being taken on the line 1—1 of Fig. 3.

Fig. 2 is a vertical sectional detail on the line 2—2 of Fig. 1.

Fig. 3 is a top plan view of Fig. 1.

Fig. 4 is a perspective view of the measuring device showing the can in section.

Fig. 5 is a plan view of one of the side plates of the measurer.

Fig. 6 is a plan view of the blank from which the body of the measuring device is formed.

Fig. 7 is a view partly in side elevation and partly in section illustrating the manner of use of the device.

It is to be understood at the outset that the invention may be applied to various types of containers, but for the sake of illustration and further description, I shall refer to the container 10 as a coffee can, this can being provided with the usual flanged top 11, which if desired, may be permanently sealed to the can. A rectangular opening 12 is formed in the can top 11 as close as practicable to the edge of the top, and the measuring device of the present invention is hingedly mounted in the opening.

The measuring device includes a rectangular plate 13, the two ends of which are bent at substantially right angles to each other. The lateral edges of the plate are centrally notched as at 14, these notches receiving the walls of the opening 12 to provide a hinge connection between the substantially L-shaped plate 13 and the can top. A pair of sector plates 15 having right angularly disposed straight edges are attached to the plate 13. Preferably the plate 13 at each side of its center line is formed with slots 16 spaced inwardly from its side edges. Bendable tongues 17 projecting from the straight edges of the sector plates 15 pass through the slots 16 and are bent around against the back of the plate 13. There is thus provided a substantially trough shaped or scoop shaped member defined by the plate 13 and the spaced sector plates 15.

The width of the plate 13 is somewhat greater than the width of the opening 12, so that when the plate is swung to either extreme position about its apex as a center, the opening 12 will be sealed by the projecting edges 18 of the plate.

Each straight side of the spaced sector plates 15 is of the same length as the length of the opening 12. Thus, there can be no relative sliding movement of the dispensing device relatively to the cover, since the slots 14 are always maintained in proper position by the engagement of the curved edges of the sector plates with the opposite wall of the opening 12.

The particular amount of material to be dispensed at one time may of course be readily controlled by predetermining the size of the measuring device. In the case of coffee cans I prefer to provide a device which will hold just one tablespoonful of coffee, enough to make a single cup. The manner of use of the apparatus is indicated in Fig. 7, wherein it will be noted that the coffee can is tilted, causing the coffee to back up behind the dispensing device. When the dispensing device is shifted from its normal closed position to the opened position of Fig. 7, it will carry with it a measured quantity of coffee. Such shifting may be readily accomplished by engaging the outer flange of the plate 13 and swinging the plate through an arc of 90°. The flanges of the plate 17 of course limit swinging movement thereof in either direction as well as effectively seal the can against the entrance of air or moisture in either extreme position of the plate.

The device is secured as close as possible to the periphery of the cover in order that substantially all of the coffee in the can may be dispensed.

The construction eliminates the use of any hinges, springs or other devices which might complicate the attachment or render it expensive to manufacture. In assembling the attachment, the plate 13 in flat condition is first inserted through the opening 12. This can be accomplished by turning the plate at an angle diagonally to the opening. The plate is subsequently bent into its L-shape and the sector plates attached.

Obviously various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claim.

I claim:

The combination with a container top having an opening therein, a trough-shaped measuring dispensing device mounted for limited tilting movement in the opening, said device including a V-shaped plate and spaced sector plates connecting the two sides thereof, said sector plates being set in from the lateral edges of the V-plate and including bendable tongues projecting from their edges passed through slots in the V-plate and bent around against the back of the latter.

Signed at New York, in the county of New York, and State of New York, this 22nd day of July, A. D. 1927.

MARION BASTIAENS.